(12) United States Patent
Uchida et al.

(10) Patent No.: US 6,495,249 B2
(45) Date of Patent: Dec. 17, 2002

(54) LAYERED PRODUCT

(75) Inventors: Kensuke Uchida, Kawasaki (JP); Shinichi Shibayama, Kawasaki (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/783,085

(22) Filed: Feb. 15, 2001

(65) Prior Publication Data

US 2002/0136914 A1 Sep. 26, 2002

(51) Int. Cl.[7] .......................... B32B 27/08; B32B 27/32
(52) U.S. Cl. ................ 428/319.3; 428/319.7; 428/319.9; 428/516; 428/519; 428/521; 428/523
(58) Field of Search .......................... 428/319.3, 319.7, 428/319.9, 515, 516, 521, 523, 519

(56) References Cited

U.S. PATENT DOCUMENTS

| | | | |
|---|---|---|---|
| 4,454,092 A | 6/1984 | Shimizu et al. | 264/349 |
| 5,187,224 A | 2/1993 | Hamanaka et al. | 524/505 |
| 5,264,476 A | 11/1993 | Daimon et al. | 524/271 |
| 6,087,431 A | 7/2000 | Uchida et al. | 524/490 |

FOREIGN PATENT DOCUMENTS

| | | |
|---|---|---|
| JP | 5720344 A | 2/1982 |
| WO | WO98/46675 | * 10/1998 |

* cited by examiner

Primary Examiner—D. S. Nakarani
(74) Attorney, Agent, or Firm—Birch, Stewart, Kolasch & Birch, LLP

(57) ABSTRACT

Disclosed is a layered product comprising a skin layer and a cushioning layer and/or a reinforcing layer, said skin layer being a thermoplastic elastomer composition which comprises (A) 1–99 parts by weight of. an ethylene-α-olefin copolymer produced by polymerizing ethylene and an α-olefin of 3–12 carbon atoms using a metallocene catalyst and (B) 1–99 parts by weight of a propylene resin [total amount of (A) and (B) being 100 parts by weight], said ethylene-α-olefin copolymer being partially or completely crosslinked.

According to the present invention, a layered product can be provided which is excellent in flexibility, has a rubber-like or leather-like appearance, and is excellent in abrasion resistance, mechanical strength and environmental resistance.

13 Claims, No Drawings

LAYERED PRODUCT

BACKGROUND OF INVENTION

The present invention relates to a layered product having a skin layer of a thermoplastic elastomer composition which comprises a specific ethylene-α-olefin copolymer and a propylene resin, said ethylene-α-olefin copolymer being partially or completely crosslinked.

Hitherto, flexible thermoplastic resins have been used for automotive interior parts such as instrument panels, head linings and door trims, bags, trunks, furniture such as chairs, and sheets for seats of various vehicles. For these uses, since flexible thermoplastic resins are generally expensive, in many cases, the flexible thermoplastic resin is used as a skin material, and a cushioning material such as a foamed polyolefin resin or a reinforcing material such as a polyolefin resin is used as a substrate, and the skin material and the substrate are laminated to obtain the desired articles. Among the flexible thermoplastic resins used as the skin material, flexible polyvinyl chloride has such features that it is hardly flawed and it can provide articles having high quality feeling of soft touch, and for these reasons, the flexible polyvinyl chloride has been mainly used for the above uses.

However, the flexible polyvinyl chloride used as the skin material has suffered from the problems in long-term weathering resistance, low-temperature resistance, bleeding out of plasticizers and high gravity. Moreover, recently, it has been ascertained that harmful dioxin is produced if organic chlorine compounds such as polyvinyl chloride is burnt by improper equipment in the waste incineration stage. As a result, use of polyvinyl chloride is being gradually avoided.

On the other hand, flexible thermoplastic polyolefin resins are light in weight, excellent in low-temperature resistance, relatively high in weathering resistance, furthermore, generates no harmful gases when incinerated, and can be recycled, and thus are the most useful as substitute materials for polyvinyl chloride.

For obtaining the flexible thermoplastic polyolefin resins, namely, polyolefin thermoplastic elastomers, there is known a method for producing so-called dynamically crosslinked polyolefin thermoplastic elastomers which comprises crosslinking under melt kneading a radical crosslinkable elastomer and an olefin resin having no radical crosslinkability in the presence of a radical initiator in an extruder. Representative examples of the elastomers are dynamically crosslinked polyolefin thermoplastic elastomers of an ethylene-propylene-non-conjugated diene copolymer (EPDM) and a polypropylene resin. However, although EPDM is excellent in crosslinkability because of the presence of a diene component in the polymer chain, it has such problems that it is insufficient in mechanical strength, inferior in abrasion resistance and readily flawed, and inferior in environmental resistance. Therefore, improvement of quality of EPDM has been demanded, and layered products comprising a polyolefin thermoplastic elastomer as a skin layer which can stand practical use are desired.

SUMMARY OF THE INVENTION

Under the circumstances, the object of the present invention is to provide a layered product which comprises a skin layer and a cushioning layer and/or a reinforcing layer (substrate) and which has no problems as mentioned above, namely, is excellent in mechanical strength, abrasion resistance and environmental resistance (weathering resistance).

As a result of intensive research conducted by the inventors, it has been found that the above problems can be solved by using, as the flexible thermoplastic resin of the skin layer, a polyolefin thermoplastic elastomer which uses as a rubber component an ethylene-α-olefin copolymer comprising ethylene and an α-olefin and having a specific structure, specifically, an ethylene-α-olefin copolymer produced using a metallocene catalyst.

That is, the layered product of the present invention is characterized by being formed of a skin layer and a cushioning layer and/or a reinforcing layer, said skin layer being a thermoplastic elastomer composition which comprises (A) 1–99 parts by weight of an ethylene-α-olefin copolymer produced by polymerizing ethylene and an α-olefin of 3–12 carbon atoms using a metallocene catalyst and (B) 1–99 parts by weight of a propylene resin [total amount of (A) and (B) being 100 parts by weight], said ethylene-α-olefin copolymer being partially or completely crosslinked.

DETAILED DESCRIPTION OF THE INVENTION

The present invention will be explained in detail below.

The ethylene-α-olefin copolymer which is the component (A) in the thermoplastic elastomer composition which is a skin layer of the layered product of the present invention is a rubber-like ethylene-α-olefin copolymer comprising ethylene and an α-olefin of 3–12 carbon atoms.

The α-olefins of 3–20 carbon atoms include, for example, propylene, butene-1, pentene-1, hexene-1, 4-methylpentene-1, heptene-1, octene-1, nonene-1, decene-1, undecene-1 and dodecene-1. These α-olefins may be used each alone or in combination of two or more. Furthermore, they may contain a copolymer component as a third component. As the copolymer component of the third component, mention may be made of, for example, conjugated dienes such as 1,3-butadiene and isoprene, and non-conjugated dienes such as dicyclopentadiene, 1,4-hexadiene, cyclooctadiene, methylenenorbornene and ethylidenenorbornene. A typical example thereof is EPDM (ethylene-propylene-diene copolymer).

As mentioned above, the present invention includes also ethylene-α-olefin copolymers in which a conjugated diene or non-conjugated diene is copolymerized, and does not exclude these copolymers, but ethylene-α-olefin copolymers containing no conjugated diene or non-conjugated diene are superior in environmental resistance and weathering resistance to ethylene-α-olefin copolymers containing conjugated diene or non-conjugated diene, and, hence, the former are more preferred.

In the present invention, the ethylene-α-olefin copolymers are produced using known metallocene catalysts.

The metallocene catalysts generally comprise a promoter and a cyclopentadienyl derivative of a metal of Group IV, such as titanium or zirconium, and they are not only high in activity as polymerization catalysts, but also, as compared with conventional Ziegler catalysts, give copolymers which are narrower in molecular weight distribution and which have a more uniform distribution of α-olefin of 3–12 carbon atoms as a comonomer. Therefore, the ethylene-α-olefin copolymers produced using metallocene catalysts greatly differ in properties from those obtained using Ziegler catalysts and the like.

The features of the ethylene-α-olefin copolymers produced using metallocene catalysts are enumerated below.

1. Because of the high activity of the polymerization catalysts, composition of α-olefin as a comonomer can be conspicuously enhanced, and elastomer-like polymers high in flexibility can be obtained even in the state of containing no plasticizers.

2. The copolymers have more uniform distribution of the comonomers as compared with polymers obtained using Ziegler catalysts.

3. The copolymers have a very sharp molecular weight distribution, contain little low-molecular weight components, are excellent in mechanical strength and workability and have high quality as compared with polymers obtained using Ziegler catalysts.

4. In spite of the highly sharp molecular weight distribution, in the case of introducing a long chain branching, the copolymers have a high ratio (I10/I2) of a melt index (I10) at 190° C./10 kgf and a melt index (I2) at 190° C./2.16 kgf as specified by ASTM D1238, and thus the copolymers are excellent in workability.

5. The copolymers hardly show blocking even if the copolymerization ratio of the α-olefin is high, and can have the form of pellets.

In the ethylene-α-olefin copolymers produced using Ziegler catalysts, the melt index ratio (I10/I2) and the molecular weight distribution show nearly linear proportional relation, and with increase of the melt index ratio, the molecular weight distribution also increases. The molecular weight distribution is about 3–10.

On the other hand, in the ethylene-α-olefin copolymers produced using metallocene catalysts, the molecular weight distribution has a sharp value of less than 3.0 irrespective of the value of the melt index ratio, and amount of the low-molecular weight components are little. Therefore, the copolymers are extremely superior in mechanical strength and workability.

The ethylene-α-olefin copolymer which is the component (A) of the thermoplastic elastomer composition as a skin layer of the layered product of the present invention has a copolymerization ratio of α-olefin of preferably 1–60% by weight, more preferably 10–50% by weight, most preferably 20–45% by weight. If the copolymerization ratio of the α-olefin exceeds 60% by weight, mechanical strength of the composition decreases and the products sometimes cannot be practically used, and if it is less than 1% by weight, the flexibility is apt to be insufficient.

Density of the ethylene-α-olefin copolymer is preferably 0.8–0.9 g/cm$^3$ from the point of balancing of mechanical strength and flexibility.

Furthermore, the ethylene-α-olefin copolymer preferably has a long chain branching. Due to the presence of the long chain branching, it becomes possible to make the density smaller as compared with the proportion (% by weight) of the copolymerized α-olefin without causing deterioration of the mechanical strength. Thus, rubber-like polymers of low density, low hardness and high strength can be obtained. Therefore, it is preferred that the α-olefin in the ethylene-α-olefin copolymer which is the component (A) of the thermoplastic elastomer composition as a skin layer of the layered product of the present invention has a carbon number of 4–12. The carbon number is more preferably 6–12. Of these copolymers, since ethylene-octene-1 copolymer in which the carbon number of the α-olefin is 8 is easy in crosslinking, excellent in rubber elasticity and contains no diene component, the copolymer can provide a thermoplastic elastomer composition excellent in environmental resistance, namely, weathering resistance, and this is most preferred.

Ethylene-α-olefin copolymers having a long chain branching are disclosed in U.S. Pat. No.5,278,272, etc.

Furthermore, the ethylene-α-olefin copolymers preferably have a melting point peak of DSC at room temperature or higher. When they have the melting point peak, they are stable in form at a temperature in the range of not higher than the melting point, excellent in handleability and less in tack.

Moreover, melt index of the ethylene-α-olefin copolymers is preferably 0.01–100 g/10 min (190° C. under a load of 2.16 kg), more preferably 0.2–10 g/10 min. If the melt index exceeds 100 g/10 min, the crosslinkability of the thermoplastic elastomer composition tends to be insufficient, and if it is less than 0.01 g/10 min, the composition is inferior in fluidity and tends to deteriorate in workability.

It is necessary that the ethylene-α-olefin copolymer which is the component (A) of the thermoplastic elastomer composition as a skin layer of the layered product of the present invention is partially or completely crosslinked. When comparison is made on the skin layers obtained by molding the thermoplastic elastomer composition with or without carrying out the crosslinking, the products obtained with carrying out the crosslinking are markedly improved in heat resistance and rubber elasticity such as permanent compression set and impact resilience. If proportion of the crosslinked ethylene-α-olefin copolymer (rubber-like polymer insoluble in solvents) in the whole ethylene-α-olefin copolymer in the thermoplastic elastomer composition of the skin layer is defined by crosslinking degree, the crosslinking degree is preferably not less than 30%, more preferably not less than 50%.

A plurality of the ethylene-α-olefin copolymers may be used in admixture, and in this case the workability can be further improved.

The propylene resins as the component (B) of the thermoplastic elastomer composition as the skin layer of the layered product of the present invention include, for example, such as isotactic polypropylene homopolymers and isotactic propylene copolymers of propylene with other α-olefins such as ethylene, butene-1, pentene-1 and hexene-1. A plurality of these propylene resins may also be used in admixture.

The melt index of the propylene resins is preferably 0.1–100 g/10 min (230° C. under a load of 2.16 kg). If the melt index exceeds 100 g/10 min, heat resistance and mechanical strengths such as bonding strength of the composition tend to be deteriorated, and if it is less than 0.1 g/10 min, the composition is inferior in fluidity and tends to deteriorate in molding workability.

The thermoplastic elastomer composition which is a skin layer of the layered product of the present invention comprises (A) 1–99 parts by weight of an ethylene-α-olefin copolymer and (B) 1–99 parts by weight of a propylene resin [total amount of (A) and (B) being 100 parts by weight]. Preferably, the composition comprises (A) 10–90 parts by weight of an ethylene-α-olefin copolymer and (B) 10–90 parts by weight of a propylene resin, and, more preferably, the composition comprises (A) 20–80 parts by weight of an ethylene-α-olefin copolymer and (B) 20–80 parts by weight of a propylene resin. If the content of the propylene resin (B) is less than 1 part by weight, fluidity and workability of the composition are deteriorated, and if it exceeds 99 parts by weight, flexibility of the composition is insufficient and this is not desirable.

In the present invention, if necessary, (C) a softening agent can be added for the improvement of workability of the thermoplastic elastomer composition.

The softening agent (C) is preferably a process oil such as paraffinic or naphthenic type. The softening agent (C) is used in an amount of 0–250 parts by weight, preferably 10–150 parts by weight for the adjustment of hardness and flexibility of the thermoplastic elastomer composition. If the amount of the softening agent (C) exceeds 250 parts by weight, bleeding of oil becomes conspicuous.

The thermoplastic elastomer composition which is a skin layer in the present invention can be improved in balancing of mechanical strength, flexibility and workability by combining, at a specific compositional ratio, (A) the ethylene-α-olefin copolymer which is a specific rubber-like polymer as explained above, (B) the propylene resin, and, if necessary, (C) the softening agent. Thus, this thermoplastic elastomer composition is preferred.

In partially or completely crosslinking the thermoplastic elastomer composition, a radical initiator such as an organic peroxide, or a radical initiator and a crosslinking aid are used.

Examples of the radical initiators used preferably here are peroxy ketals such as 1,1-bis(t-butylperoxy)-3,3,5-trimethylcyclohexane, 1,1-bis(t-hexylperoxy)-3,3,5-trimethylcyclohexane, 1,1-bis(t-hexylperoxy)cyclohexane, 1,1-bis(t-butylperoxy)cyclododecane, 1,1-bis(t-butylperoxy)cyclohexane, 2,2-bis(t-butylperoxy)octane, n-butyl-4,4-bis(t-butylperoxy)butane and n-butyl-4,4-bis(t-butylperoxy)valerate; and dialkyl peroxides such as di-t-butyl peroxide, dicumyl peroxide, t-butylcumyl peroxide, α, α'-bis (t-butylperoxy-m-isopropyl)benzene, α, α'-bis(t-butylperoxy)diisopropylbenzene, 2,5-dimethyl-2,5-bis(t-butylperoxy)hexane and 2,5-dimethyl-2,5-bis(t-butylperoxy)hexyne-3.

Further examples are diacyl peroxides such as acetyl peroxide, isobutyryl peroxide, octanoyl peroxide, decanoyl peroxide, lauroyl peroxide, 3,5,5-trimethylhexanoyl peroxide, benzoyl peroxide, 2,4-dichlorobenzoyl peroxide and m-tolyoyl peroxide; and peroxy esters such as t-butylperoxy acetate, t-butylperoxy isobutyrate, t-butylperoxy-2-ethyl hexanoate, t-butylperoxy laurate, t-butylperoxy benzoate, di-t-butylperoxy isophthalate, 2,5-dimethyl-2,5-di(benzoylperoxy)hexane, t-butylperoxymaleic acid, t-butylperoxyisopropyl carbonate and cumylperoxy octate.

Additional examples are hydroperoxides such as t-butyl hydroperoxide, cumene hydroperoxide, diisopropylbenzene hydroperoxide, 2,5-dimethylhexane-2,5-dihydroperoxide and 1,1,3,3-tetramethylbutyl peroxide.

Of these compounds, preferred are 1,1-bis(t-butylperoxy)-3,3,5-trimethylcyclohexane, di-t-butyl peroxide, dicumyl peroxide, 2,5-dimethyl-2,5-bis(t-butylperoxy)hexane and 2,5-dimethyl-2,5-bis(t-butylperoxy)hexyne-3.

These radical initiators are used in an amount of 0.02–3 parts by weight, preferably 0.05–1 part by weight based on 100 parts by weight of the ethylene-α-olefin copolymer (A). If the amount is less than 0.02 part by weight, the crosslinking tends to be insufficient and, on the other hand, even if it exceeds 3 parts by weight, the properties of the composition are sometimes not improved.

As the crosslinking aids, there may be preferably used divinylbenzene, triallyl isocyanurate, triallyl cyanurate, diacetonediacrylamide, polyethylene glycol diacrylate, polyethylene glycol dimethacrylate, trimethylolpropane trimethacrylate, trimethylolpropane triacrylate, ethylene glycol dimethacrylate, triethylene glycol dimethacrylate, diethylene glycol dimethacrylate, diisopropenylbenzene, P-quinone dioxime, P,P'-dibenzoylquinone dioxime, phenylmaleimide, allyl methacrylate, N,N'-m-phenylenebismaleimide, diallyl phthalate, tetraallyloxyethane, 1,2-polybutadiene, and the like. These crosslinking aids may also be used in combination of two or more.

These crosslinking aids are used in an amount of 0.1–5 parts by weight, preferably 0.5–2 parts by weight based on 100 parts by weight of the ethylene-α-olefin copolymer (A). If the amount is less than 0.1 part by weight, the crosslinking tends to be insufficient and even if it exceeds 5 parts by weight, the properties of the composition are no longer improved and the excess crosslinking aids tend to remain.

In the present invention, other resins or elastomers may be added in addition to the thermoplastic elastomer composition to such an extent as not damaging the characteristics of the composition.

The other resins or elastomers include, for example, polyamide resins, polyphenylene ether resins, polystyrene resins, polyvinyl chloride resins, polyester resins, polyphenylene sulfide resins, olycarbonate resins, polyolefin resins, polymethacrylate resins, polyacetal resins, polyarylate resins, polysulfone resins, block copolymers comprising at least one polymer block segment A mainly composed of vinyl aromatic compound and at least one polymer block segment B mainly composed of conjugated diene compound or said block copolymers which are hydrogenated, styrene-butadiene random copolymers, ethylene-vinyl ester copolymers such as ethylene-vinyl acetate copolymers, ethylene-unsaturated carboxylic acid ester copolymers such as ethylene-ethyl acrylate copolymers, ethylene-vinyl alcohol copolymers, polybutadienes, polybutenes, and polyisobutenes.

In more detail, the said polystyrene resins are rubber-modified styrene resins and/or rubber-unmodified styrene resins, and, especially, examples of the rubber-modified styrene resins are impact-resistant polystyrene, ABS resins (acrylonitrile-butadiene-styrene copolymer), AAS resins (acrylonitrile-acrylic rubber-styrene copolymer), and AES resins (acrylonitrile-ethylene propylene rubber-styrene copolymer).

Here, thermoplastic resins of the polyamide type, polyester type or polycarbonate type are especially preferred in order to improve chemical resistance, oil resistance and heat resistance.

Moreover, the thermoplastic elastomer composition which is the skin layer of the present invention can contain inorganic fillers and plasticizers as far as the characteristics of the composition are not damaged.

As the inorganic fillers, mention may be made of, for example, calcium carbonate, magnesium carbonate, silica, carbon black, glass fibers, titanium oxide, clay, mica, talc, magnesium hydroxide and aluminum hydroxide. As the plasticizers, mention may be made of, for example, polyethylene glycol, and phthalic acid esters such as dioctyl phthalate (DOP).

Furthermore, there may be suitably used other additives such as lubricants, organic and inorganic pigments, heat stabilizers, antioxidants, ultraviolet absorbers, light stabilizers, flame retardants, silicone oils, anti-blocking agents, foaming agents, antistatic agents and anti-fungus agents.

The thermoplastic elastomer composition which is the skin layer of the present invention can be produced by melt-kneaders ordinarily used for the production of thermplastic elastomer compositions. Examples of the melt-kneaders are batch type kneaders such as mixing roll, Banbury mixer and pressure kneader, and continuous kneaders such as single-screw extruders and twin-screw extruders.

The thermoplastic elastomer composition can be produced, for example, through the following processing steps.

That is, the ethylene-α-olefin copolymer (A) and the propylene resin (B) are well mixed and introduced into a hopper of an extruder. The radical initiator and the crosslinking aid may be added initially together with the ethylene-α-olefin copolymer (A) and the propylene resin (B) or may be added at the intermediate position of the extruder. The oil may be added initially or at the intermediate position of the extruder or may be divided and separately added initially and at the intermediate position. A part of the ethylene-α-olefin copolymer (A) and the propylene resin (B) may be added at the intermediate position of the extruder. The components are molten with heat and kneaded in the extruder to carry out-the crosslinking reaction of the ethylene-α-olefin copolymer (A) with the radical initiator and the crosslinking aid, and, furthermore, oil and others are added, followed by melt kneading to perform sufficient crosslinking reaction and kneading dispersion, and then the reaction product is taken out from the extruder. The product is pelletized to obtain pellets of the thermoplastic elastomer composition which is a starting material for the skin layer of the present invention.

Next, the cushioning layer or the reinforcing layer which is a substrate of the layered product of the present invention will be explained.

The cushioning layer includes, for example, elastomers, foamed products comprising various resins or elastomers, nonwoven fabrics and woven fabrics. The reinforcing layer includes, for example, various resins, elastomers, nonwoven fabrics, woven fabrics, metals, ceramics, woods and papers.

When the cushioning layer or the reinforcing layer comprises a polyolefin resin such as polyethylene or polypropylene, adhesion or draping to the skin layer of the present invention is improved and, hence, polyolefin resin is most preferred.

Especially, in the case of using the layered product of the present invention as automotive interior parts, use of foamed products of polyolefin resins comprising polypropylene resin, polyethylene resin or a mixture thereof, particularly, foamed products or reinforced products of polyolefin resins comprising polypropylene resin results in improvement of adhesion between the skin layer and the substrate, and, besides, recycling can be easily attained. Therefore, they are very preferred.

The layered product of the present invention can be produced, for example, by the following methods to which the present invention is not limited.

(1) First, the thermoplastic elastomer composition which is a material for the skin layer is formed into a sheet by extrusion, calendering, press molding, blow molding and the like. The skin layer can have various thickness, and usually the thickness is 0.01–10 mm. This skin layer is heat fusion bonded or bonded with adhesives or the like to the cushioning layer or the reinforcing layer as a substrate to obtained a layered product.

(2) This method is generally called insert molding, and according to this method, using an injection molding machine, a film or sheet of the thermoplastic elastomer composition as a material for the skin layer is previously applied to the inner surface of the mold, and a reinforcing layer such as polyolefin resin is injection molded in the mold to obtain a layered product. In this case, if a foaming agent is incorporated into the reinforcing material, the substrate can be a foamed cushioning layer.

(3) This method is generally called two-color molding, and according to this method, first the thermoplastic elastomer which forms the skin layer is injection molded and then a reinforcing material such as polyolefin resin is injection molded using two injection molding machines to obtain a molded product. In this case, if a foaming agent is incorporated into the reinforcing material, the substrate can be a foamed cushioning layer.

(4) The thermoplastic elastomer composition as the skin layer and the reinforcing layer such as a polyolefin resin are co-extruded to obtain a layered product.

As explained above, the layered product of the present invention comprises a laminate of a cushioning layer and/or a reinforcing layer which is a substrate and a skin layer comprising a thermoplastic elastomer composition comprising an ethylene-α-olefin copolymer produced using a metallocene catalyst and a propylene resin, said ethylene-α-olefin copolymer being partially or completely crosslinked. This layered product is more flexible and has a rubber-like or leather-like appearance, and, besides, is excellent in abrasion resistance and mechanical strength. Furthermore, in the case of using the ethylene-α-olefin copolymer containing no diene component, the layered product is further excellent in environmental resistance.

Furthermore, when the substrate of the layered product of the present invention is a cushioning layer such as a foamed product, use of the layered product for instrument panels of cars results in high cushioning properties and high safety in case human bodies hit against the panels due to a car crash. Moreover, even if the substrate is not a foamed product, but a reinforcing material, the surface is covered with a soft thermoplastic elastomer, which acts as a cushioning layer to improve the safety.

The layered product of the present invention can be employed for various uses, for example, automotive interior parts such as instrument panels, head-linings, door trims, console boxes, sheet shields, rear panels and steering wheel covers, bags, trunks, furniture such as chairs, seat sheets and cushioning sheets for various vehicles, skin layers of household appliances and office automation devices, skin layers of sport goods, miscellaneous goods, daily necessaries and stationery, wall coverings, floor coverings, and building materials. Thus, the layered products of the present invention are industrially very valuable.

DESCRIPTION OF PREFERRED EMBODIMENTS

The present invention will be explained in more detail by the following examples and comparative examples, which are not intended for purpose of limitation. Test methods employed for evaluation of various properties in the examples and the comparative examples are shown below.

(1) Surface Hardness

Four sheets of thermoplastic elastomer having a thickness of 2 mm were stacked, and the evaluation was conducted in accordance with ASTM D2240, A type or D type in an atmosphere of 23° C.

(2) Tensile Break Strength [MPa]

The thermoplastic elastomer was evaluated in accordance with JIS K6251 at 23° C.

(3) Retention of Environmental Deterioration Resistance

Using carbon arc type sunshine weatherometer (manufactured by Suga Tester Mfg. Co., Ltd.), a compression molded sheet of 2 mm in thickness was continuously exposed for 150 hours in accordance with ASTM D1499 under the conditions of a black panel temperature of 63° C. and rainfall time 18 minutes/irradiation time 120 minutes, and after the exposure for 150 hours, retention [%] of the tensile strength was measured.

(4) Abrasion Resistance

A stainless steel sheet of 5 cm×5 cm×2 mm having a felt fabric stuck to the underside was put on the skin layer, and a weight was placed so as to give a load of 100 g/cm$^2$, followed by carrying out reciprocation of 10000 times at a rate of 30 reciprocations/min. Then, the surface state was judged by the following criteria.

○: Substantially no flaws were seen.

Δ: Flaws were seen.

X: Considerable flaws were seen.

The following components were used in the examples and comparative examples.

(i) Ethylene-α-olefin Copolymers (a) Ethylene-octene-1 Copolymer

This was prepared by the process using metallocene catalysts as disclosed in JP-A-3–163088. The compositional ratio of ethylene/octene-1 of the copolymer was 72/28 (weight ratio). The resulting copolymer was referred to as "EO-1".

(b) Ethylene-propylene-dicyclopentadiene Copolymer (1)

This was prepared by the process using metallocene catalysts as disclosed in JP-A-3–163088. The compositional ratio of ethylene/propylene/ dicyclopentadiene of the copolymer was 50/41/9 (weight ratio). The resulting copolymer was referred to as "EO-2".

(c) Ethylene-propylene-dicyclopentadiene Copolymer (2)

This was prepared by a general process using a Ziegler catalyst. The compositional ratio of ethylene/propylene/ dicyclopentadiene of the copolymer was 47.5/43/9.5 (weight ratio). The resulting copolymer was referred to as "EO-3".

(ii) Propylene Resin

Homoisotactic polypropylene manufactured by Japan Polychem Co., Ltd. (referred to as "PP").

(iii) Paraffinic Oil

Diana Process Oil PW-380 manufactured by Idemitsu Kosan Co., Ltd. (referred to as "MO").

(iv) Radical Initiator 2,5-Dimethyl-2,5-bis(t-butylperoxy)hexane (trade name: PERHEXA 25B) manufactured by Nippon Oil & Fats Co., Ltd. (referred to as "POX").

(v) Crosslinking Aid

Divinylbenzene manufactured by Wako Junyaku Co., Ltd. (referred to as "DVB").

EXAMPLES 1–3 AND COMPARATIVE EXAMPLE 1

A polymer composition comprising EO, PP, POX, DVB and MO in the given amounts shown in Table 1 was prepared by a dynamic crosslinking method using a twin-screw extruder (40 mmφ, L/D=47) having a pouring port at the center of barrel and kneading parts before and after the pouring port.

That is, the components shown in Table 1 other than MO were mixed and then introduced into a hopper of the twin-screw extruder (cylinder temperature: 220° C.). Subsequently, the given amount of MO was poured from the pouring port provided at the center of the extruder, and the components were melt kneaded to obtain a thermoplastic elastomer composition. Then, using the composition, a sheet having a width of 60 cm and a thickness of 0.5 mm was prepared using an extrusion molding machine with T-die (extrusion temperature: 220° C.).

The resulting sheet of the thermoplastic elastomer composition and a foamed PP sheet (thickness: 2 mm, foaming ratio: 20 times) were previously heated to 180° C., and then these sheets were stacked and passed between two pressure rolls heated to 180° C. at a take-off speed of 4 m/min to make a layered sheet.

The resulting layered sheet had a proper cushioning and a proper flexibility. Both the sheets were heat fusion bonded at the interface, and when it was attempted to separate them from each other, the foamed PP sheet was broken. Thus, it was found that they were firmly bonded.

Characteristics of the layered products are shown in Table 1. The characteristics were measured on only the molded product of the thermoplastic elastomer composition, but the layered product shows the same characteristics.

TABLE 1

|  | Example 1 | Example 2 | Example 3 | Compara. Example 1 |
|---|---|---|---|---|
| Composition |  |  |  |  |
| EO-1 | 100 | 100 | — | — |
| EO-2 | — | — | 100 | — |
| EO-3 | — | — | — | 100 |
| PP | 35 | 60 | 35 | 35 |
| Oil | 65 | 65 | 65 | 65 |
| POX | 0.5 | 0.5 | 0.5 | 0.5 |
| DVB | 1 | 1 | 1 | 1 |
| Characteristics |  |  |  |  |
| Surface hardness | 69 | 82 | 68 | 68 |
| Tensile strength (MPa) | 7.7 | 8.5 | 7.6 | 6.2 |
| Retention of environmental deterioration resistance | 92 | 93 | 77 | 75 |
| Abrasion resistance | ○ | ○ | ○ | Δ |

What is claimed is:

1. A layered product comprising a skin layer and a cushioning layer and/or a reinforcing layer, said skin layer being a thermoplastic elastomer composition which comprises (A) 1–99 parts by weight of an ethylene-α-olefin copolymer produced by polymerizing ethylene, an α-olefin of 3–12 carbon atoms and a non-conjugated diene using a metallocene catalyst and (B) 1–99 parts by weight of a propylene resin, said ethylene-α-olefin copolymer being partially or completely crosslinked.

2. A layered product according to claim 1, wherein the ethylene-α-olefin copolymer is obtained by polymerizing ethylene and an α-olefin of 6–12 carbon atoms.

3. A layered product according to claim 1, wherein the cushioning layer and/or the reinforcing layer comprise a polyolefin resin.

4. A layered product according to claim 2, wherein the cushioning layer and/or the reinforcing layer comprise a polyolefin resin.

5. A layered product according to any one of claims 1–4, wherein the cushioning layer comprises a foamed polyolefin resin.

6. A layered product according to claim 1, wherein the ethylene-α-olefin copolymer (A) has a molecular weight distribution of less than 3.0.

7. A layered product according to claim 1, wherein the ethylene-α-olefin copolymer (A) has a copolymerization ratio of α-olefin of 20–45% by weight.

8. A layered product according to claim 1, wherein the ethylene-α-olefin copolymer (A) has a density of 0.8–0.9 g/cm$^3$.

9. A layered product according to claim 1, wherein the α-olefin is propylene and the non-conjugated diene is dicyclopentadiene.

10. A layered product according to claim 1, wherein the ethylene-α-olefin copolymer. (A) has a melt index of 0.2–10 g/10 min (190° C. under a load of 2.16 kg).

11. A layered product according to claim 1, wherein the ethylene-α-olefin copolymer (A) has a crosslinking degree of not less than 50%.

12. A layered product according to claim 1, wherein the propylene resin (B) is an isotactic polypropylene homopolymer or copolymer.

13. An automotive interior part, bag, trunk, furniture, cushioning sheet, household appliance, office automation device, sporting good, stationery, wall covering, floor covering, or building material comprising the layered product of claim 1.

* * * * *